Patented Dec. 12, 1922.

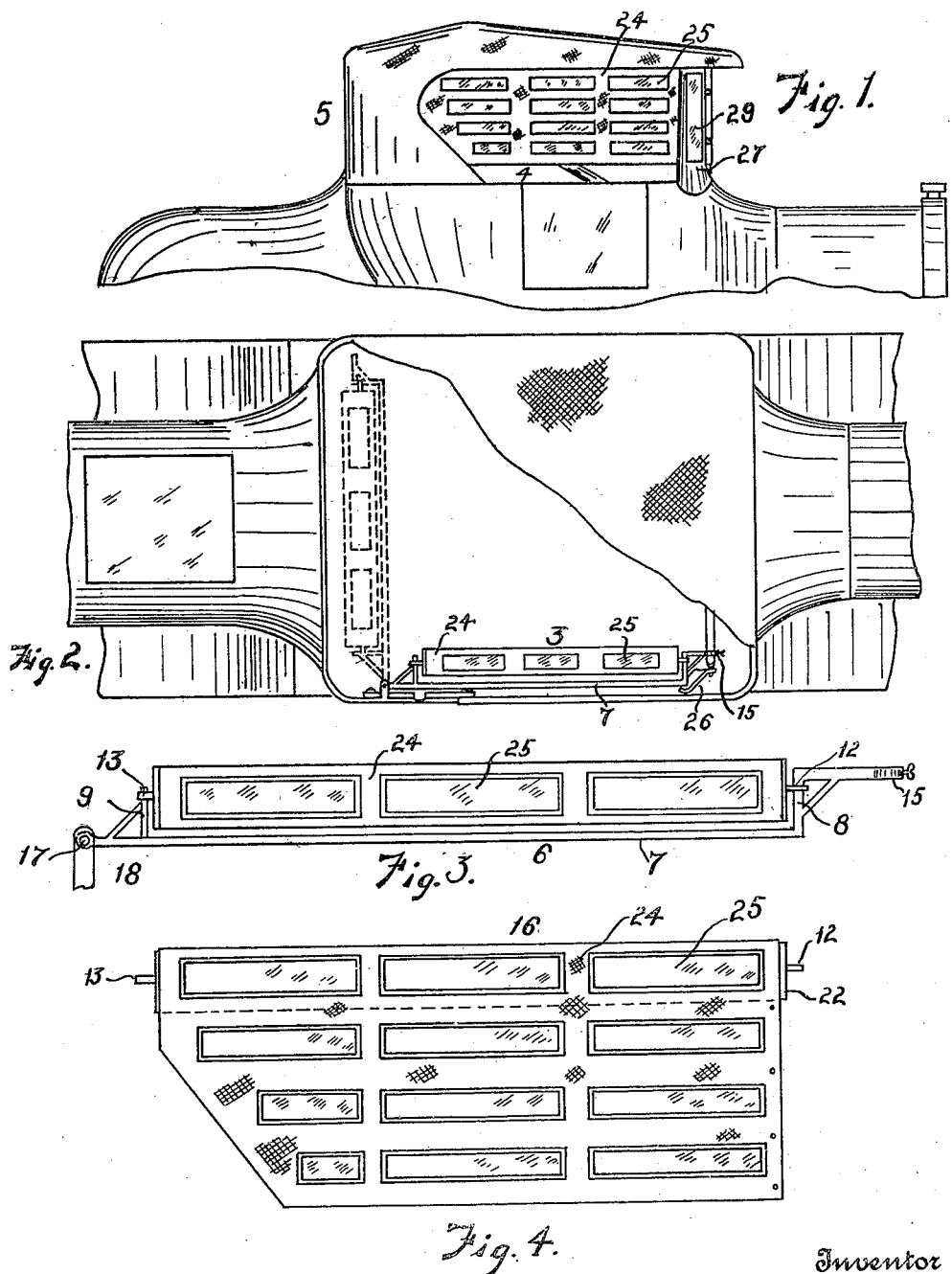
L. K. MULFORD.
SPRING ROLLER SIDE CURTAIN CONSTRUCTION FOR AUTOMOBILES.
APPLICATION FILED MAR. 31, 1919.
1,438,458. Patented Dec. 12, 1922.
2 SHEETS—SHEET 1.

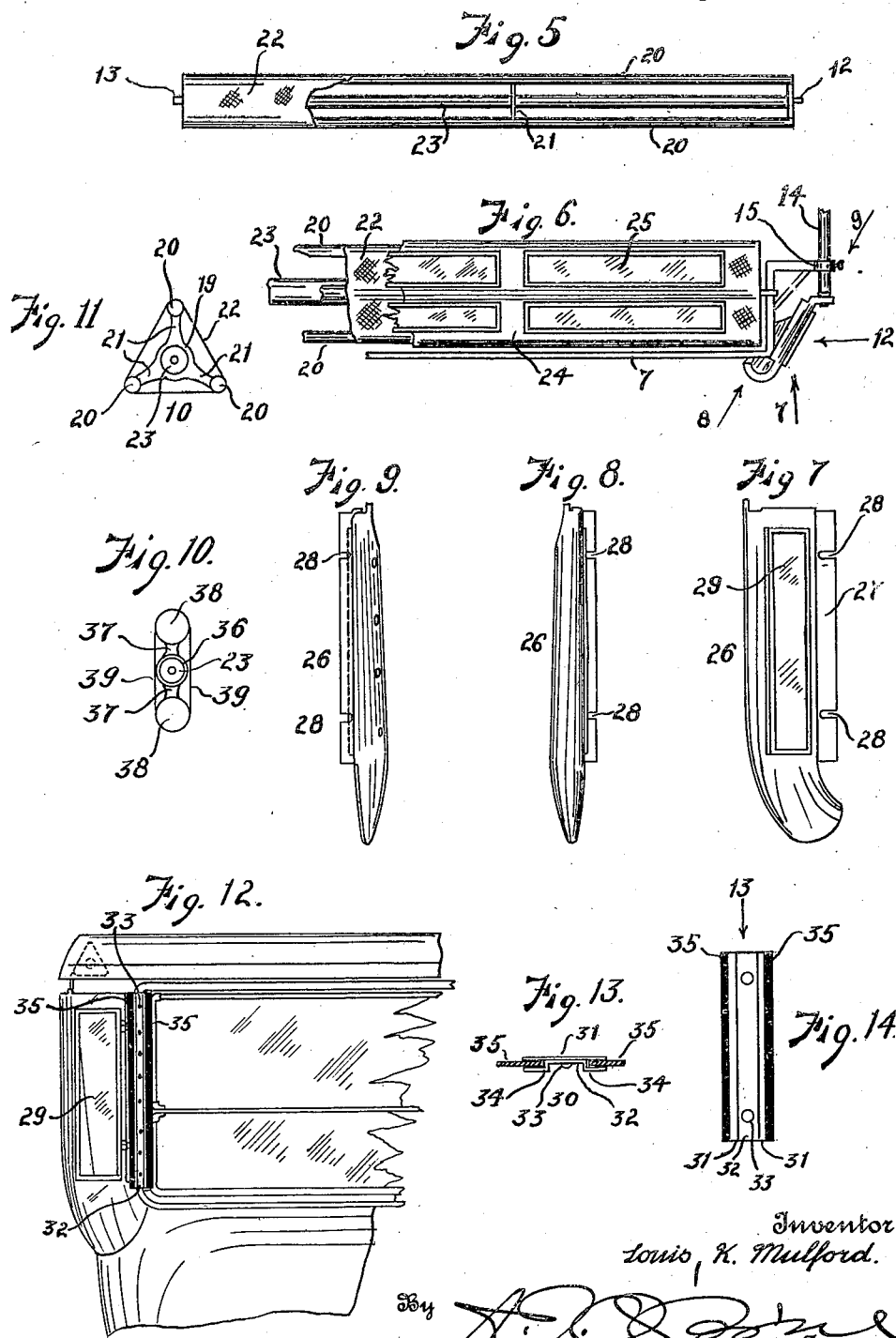

1,438,458

UNITED STATES PATENT OFFICE.

LOUIS K. MULFORD, OF DENVER, COLORADO.

SPRING-ROLLER SIDE-CURTAIN CONSTRUCTION FOR AUTOMOBILES.

Application filed March 31, 1919. Serial No. 286,324.

*To all whom it may concern:*

Be it known that I, LOUIS K. MULFORD, a citizen of the United States, residing at the city and county of Denver, and State of Colorado, have invented certain new and useful Improvements in Spring-Roller Side-Curtain Constructions for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a side curtain construction for automobiles, involving a spring roller with which the curtain is connected, the exterior structure of the roller being such that it has a number of flat sides adapted to accommodate transparent sections set into the curtain at suitable intervals, and so arranged as to engage the flat sides of the roller, there being spaces between the transparent sections, which are flexible so that the curtain may be wound around the polygonal-shaped roller without injury to the transparent sections which are preferably composed of glass. The roller is mounted above the side opening of the automobile top, in such a manner that it may be pulled down and raised in the same manner as a window shade mounted on a spring roller of ordinary construction.

Provision is made at the opposite front corners, or at the opposite ends of the windshield for closing spaces, which would otherwise be left between the ends of the curtains and the windshield. For this purpose I employ corner members, each of which is provided with a transparent section of suitable area. Furthermore, at each end of the windshield, and adjacent the corner housing, I equip the windshield with a weather strip member adapted to close a narrow space which would otherwise be left between the end of the windshield and the corner housing, this weather strip member also having a flexible part which closes the narrow space between the movable part of the windshield and the stationary upright frame bar.

Having briefly outlined my improvement, I will proceed to describe the same in detail, reference being made to the accompanying drawing, in which is illustrated an embodiment thereof. In this drawing:

Fig. 1 is a fragmentary side elevation of an automobile body equipped with my improvement.

Fig. 2 is a top plan view of the same, showing the top partly broken away.

Fig. 3 is a top view in detail of my improved side curtain roller construction shown on a larger scale than in the previous views.

Fig. 4 is a side view of the roller showing the curtain unwound therefrom and in approximately the same position as shown in Fig. 1, but on a larger scale.

Fig. 5 is a detail view of the roller partly broken away.

Fig. 6 is a fragmentary view of the roller and curtain structure, illustrating the manner of mounting the roller at one end, the parts being shown on a larger scale than in Fig. 5.

Fig. 7 is a detail view of the corner housing, looking in the direction of arrow 7, Fig. 6.

Figs. 8 and 9 are views looking in the direction of arrows 8 and 9, respectively, in Fig. 6.

Fig. 10 is an end view of a roller member having but two flat sides.

Fig. 11 is a similar view of a roller member with three sides.

Fig. 12 is a fragmentary front view of an automobile body equipped with my improvement, the weather strip member being in place between the end of the windshield and the corner housing.

Fig. 13 is a cross section of the weather strip member shown on a larger scale.

Fig. 14 is an elevation of the same on a smaller scale but still larger than in Fig. 12.

The same reference characters indicate the same parts in all the views.

Let the numeral 5 designate an automobile top, the frame of which is equipped on each side with a rod or bar 6, having a relatively long part, 7, extending lengthwise of the top and having inwardly projecting parts, 8 and 9, at its opposite ends, in which a spring roller, 10, is mounted in the usual manner, one of the end pins 12 engaging the part 8 to prevent rotary movement, while the opposite pin 13 is mounted to rotate in the usual or customary manner of a spring roller. The offset 8 is connected with the stationary top bar 14 of the windshield, as shown at 15, and in such a manner that it may be readily detached. This connection 15 is of such character that the forward extremity of the bar 6 is suitably supported when the roller is in use for regulating the curtain 16. The opposite end of the bar 6 is pivotally connected, as shown at 17, with a stationary part 18, mounted on the upper portion of the framework of the top 5, whereby the bar 6 and the roller supported thereby, together with the curtain upon the roller, may be swung from the full-line to the dotted-line position in Fig. 2, when for any reason it is not desired to employ the curtain.

In the main views, the roller 10 is composed of a number of spider-shaped members 19, having parallel longitudinally disposed parts 20 at the extremities of the arms 21 which, as shown in the main views, are three in number. The bars 20 extend the full length of the roller, which in this form of construction is triangular in cross section, the spaces between the bars 20 being closed by canvas, 22, whereby the roller is made relatively light. Each of the spiders 19 has a central hub, provided with an opening through which the spring roller member 23 passes and in which this member is secured to allow it to operate in the usual manner during the manipulation of the curtain. This curtain is composed of suitable flexible material, as canvas, 24, in which are set at suitable intervals transparent sections 25, which may be composed of glass of suitable strength. The longitudinally disposed areas of the curtain in which the transparent sections are placed, are so arranged as to cover the sides of the roller, the transparent sections being of suitable area to enable those within the car to have a sufficient view therethrough. There is a suitable area of canvas between the longitudinal areas in which the transparent sections 25 are located to permit the curtain to wind upon and unwind from the roller freely, as will be readily understood from an inspection of the drawing.

In order to close the space which would otherwise be left between each end of the windshield and the front edge of the curtain, I provide corner housings, 26, each of which is so disposed that its longitudinal dimension is vertical, while its transverse dimension is diagonally positioned, its inward forward edge having a flange, 27, which is slotted as shown at 28, to receive bolts with which the windshield is provided. The nuts with which these bolts are normally provided are removed when the housing member is placed in position and afterwards screwed upon the bolts against the flange 27 to hold the housing in place. The housing is provided with a transparent section 29 of sufficient area to provide a good view in the direction of these housings.

Secured to each of the stationary end bars of the windshield is a weather strip member 30, which is composed of two plates, 31 and 32, connected by fastening rivets 33, one of the plates being offset on opposite sides, as shown at 34, to form grooves in which flexible strips 35 may be secured, these strips extending beyond the plates and sealing the space between the vertical bar of the windshield and the movable inner portions of the shield on one side, and the space between the housing 26 and the vertical bar of the windshield on the other side.

In the event that the roller has only two sides, as shown in Fig. 10, the roller-supporting members 36 will each have but two arms 37 which are connected with longitudinally disposed rigid parts 38, which will be connected by canvas sides, 39, of sufficient area to accommodate the transparent sections 25 of the curtain.

From the foregoing description, the use and operation of my improvement will, it is believed, be readily understood without further explanation in detail.

I claim:

1. In combination, an automobile top and windshield, an upper support in said top, a spring roller carried by said support and connected therewith in cooperative relation, a curtain attached to the roller and having areas provided with transparent sections, a front corner housing cooperating with the curtain to close the space between the windshield and the adjacent front end of the curtain, and a weather strip member applied to the windshield and serving to close the space between the windshield and the corner housing.

2. In combination, an automobile top and windshield, an upper support, a spring roller carried by said support and connected therewith in cooperative relation, a curtain attached to the roller and having areas provided with transparent sections, a front corner housing cooperating with the curtain to close the space between the windshield and the adjacent front end of the curtain, and a weather strip member mounted on the stationary end bar of the windshield and adapted to close the space between the corner housing and the said bar and also between the said bar and the movable part of the windshield.

3. In combination, an automobile, a top and a windshield thereon in operative relation, a support mounted in said top and pivotally connected at the rear end with the top and detachably connected at the other end with the windshield, a spring roller mounted on said support, a curtain mounted on said roller, said curtain having a plurality of transparent sections, and said roller having a plurality of flat faces to accommodate said sections when rolled, whereby the transparent sections will not be bent when the curtain is rolled up.

In testimony whereof I affix my signature.

LOUIS K. MULFORD.